(12) United States Patent
Sasaki

(10) Patent No.: US 6,320,726 B1
(45) Date of Patent: Nov. 20, 2001

(54) THIN FILM MAGNETIC HEAD AND METHOD OF MANUFACTURING THE SAME, AND METHOD OF FORMING THIN FILM COIL

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/455,448

(22) Filed: Dec. 6, 1999

(30) Foreign Application Priority Data

Dec. 9, 1998 (JP) ................................................. 10-350070

(51) Int. Cl.$^7$ ................................ G11B 5/147; G11B 5/17
(52) U.S. Cl. ............................................. 360/126; 360/123
(58) Field of Search ..................................... 360/126, 123

(56) References Cited

U.S. PATENT DOCUMENTS

| | | | |
|---|---|---|---|
| 4,819,112 | * | 4/1989 | Iwata et al. ........................... 360/126 |
| 5,113,300 | * | 5/1992 | Ikeda et al. ........................... 360/126 |
| 5,473,491 | * | 12/1995 | Fujisawa et al. ..................... 360/126 |
| 5,856,898 | * | 1/1999 | Ohashi .................................. 360/123 |
| 6,191,916 | * | 2/2001 | Sasaki .................................. 360/126 |
| 6,212,034 | * | 4/2001 | Fedeli et al. .......................... 360/126 |

* cited by examiner

Primary Examiner—William Klimowicz
(74) Attorney, Agent, or Firm—Oliff & Berridge, PLC

(57) ABSTRACT

A dummy pole piece is selectively formed on a write gap layer. After that, a thin film coil of a first layer is formed on the write gap layer and, simultaneously, a coil connecting part integral with the thin film coil is formed on at least the side wall surfaces of the dummy pole piece. Then an insulating layer is formed so as to cover the thin film coil, the dummy pole piece and the coil connecting part, and the write gap layer and the insulating layer is polished until a top pole piece, a top connection piece, and the dummy pole piece are exposed. Subsequently, a thin film coil of a second layer is formed on the write gap layer and a coil connecting part integral with the thin film coil is formed on the exposed face of the coil connecting part.

7 Claims, 15 Drawing Sheets

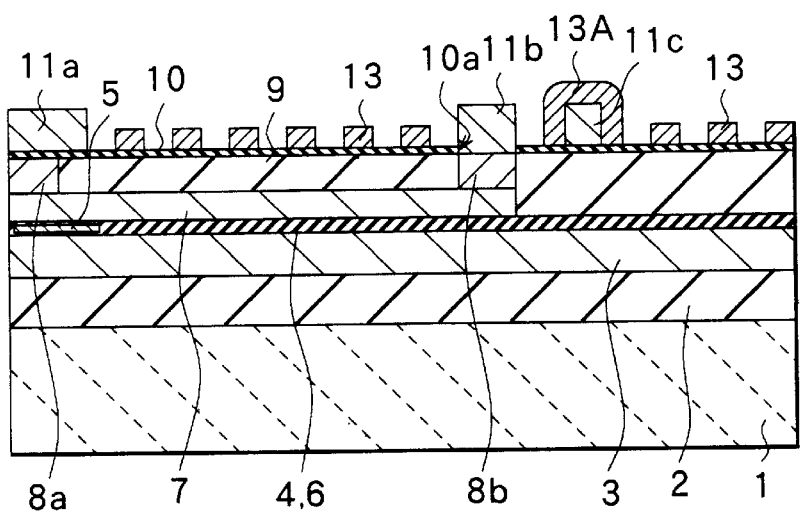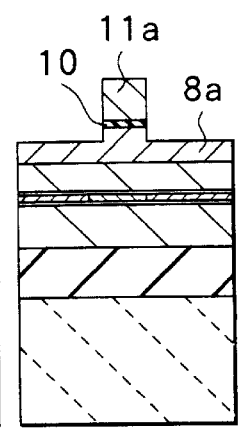
FIG.4A  FIG.4B
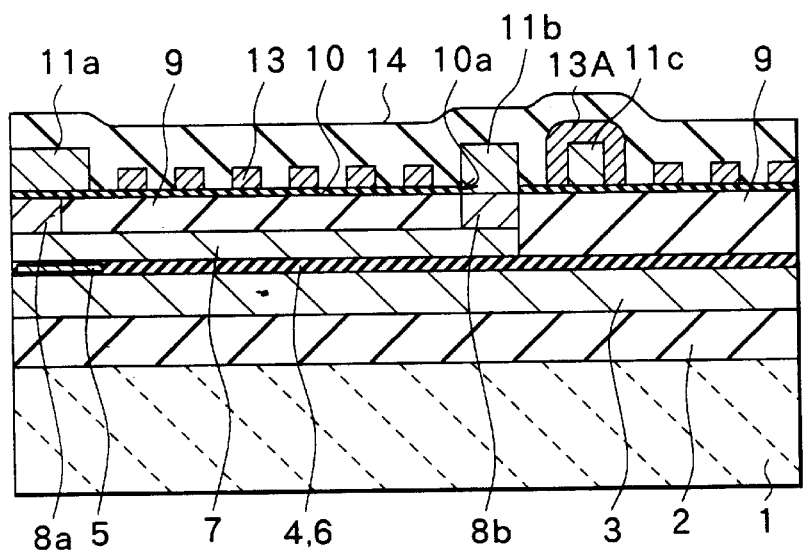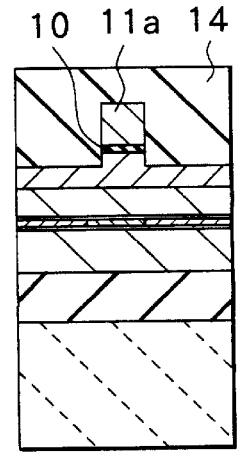
FIG.5A  FIG.5B

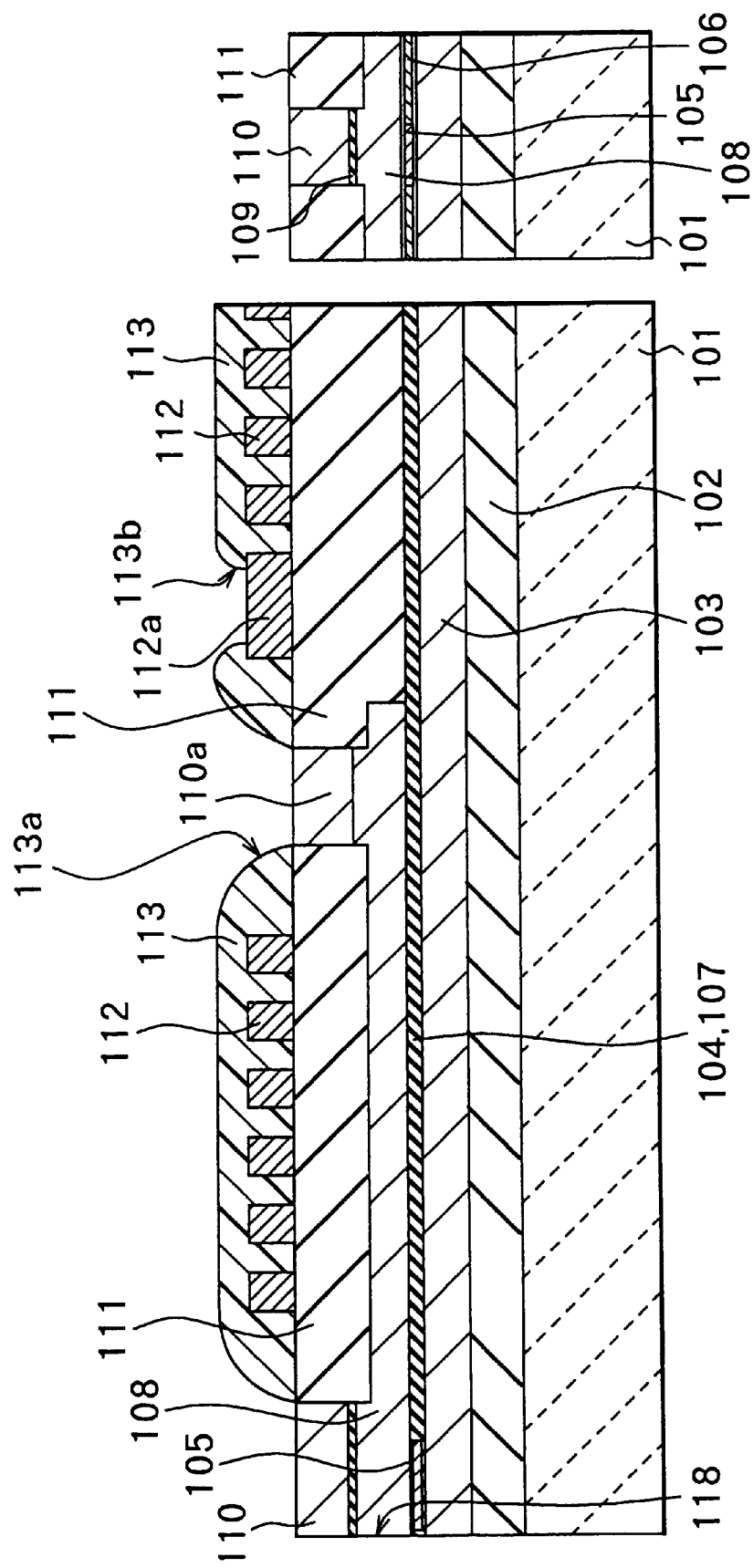

THIN FILM MAGNETIC HEAD AND METHOD OF MANUFACTURING THE SAME, AND METHOD OF FORMING THIN FILM COIL

BACKGROUND OF THE INVENTION

1. Field of the Invention

The present invention relates to a thin film magnetic head having at least an inductive-type magnetic transducer for writing, a method of manufacturing the same, and a method of forming a thin film coil.

2. Description of the Related Art

In recent years, improvement in performance of thin film magnetic heads has been sought in accordance with improvement in surface recording density of a hard disk drive. As a thin film magnetic head, a composite thin film magnetic head in which a recording head having an inductive-type magnetic transducer for writing and a reproducing head having a magnetoresistive element (hereinbelow, referred to as MR) for reading-out are stacked is widely used. MR elements include an AMR using an anisotropic magnetoresistive effect (hereinbelow, referred to as AMR) and a GMR element using giant magnetoresistive effect (hereinbelow, described as GMR). A reproducing head using the AMR element is called an AMR head or simply an MR head. A reproducing head using the GMR element is called a GMR head. The AMR head is used as a reproducing head whose surface recording density is higher than 1 gigabit per square inch. The GMR head is used as a reproducing head whose surface recording density is higher than 3 gigabits per square inch.

As methods of improving the performance of a reproducing head, there are a method of changing the material of the MR film to a material having excellent magnetoresistivity of the AMR film, GMR film, or the like, and a method of making the pattern width of the MR film, especially, the MR height proper, and the like. The MR height is the length (height) from the end part on the air bearing surface side of the MR element to the end part on the opposite side and is controlled by the polishing amount at the time of processing the air bearing surface. The air bearing surface is a surface of a thin film magnetic head, which faces a magnetic recording medium, and is also called a track surface.

On the other hand, in accordance with the improvement in performance of a reproducing head, the improvement in performance of a recording head is also required. One of the factors of determining the performance of a recording head is the throat height (TH). The throat height is the length (height) of a magnetic pole part extending from the air bearing surface to the edge of an insulating layer which electrically isolates a thin film coil for generating a magnetic flux. In order to improve the performance of a recording head, reduction in the throat height is desired. The throat height is also controlled by the polishing amount at the time of processing the air bearing surface.

Further, in order to improve the performance of the recording head, it is proposed to shorten the length (hereinbelow, called a magnetic path length) of the part sandwiching the thin film coil of a bottom pole and a top pole formed while sandwiching a write gap.

With reference to FIGS. 16A and 16B through FIG. 21, as an example of a method of manufacturing a conventional thin film magnetic head, an example of a method of manufacturing a composite thin film magnetic head will be described. FIGS. 16A through 20A are sections each of which is perpendicular to the air bearing surface in a main manufacturing process. FIGS. 16B through 20B are sections each of which is parallel to the air bearing surface in a main manufacturing process. FIG. 21 illustrates a plane structure of a completed composite thin film magnetic head.

First, as shown in FIGS. 16A and 16B, an insulating layer 102 made of, for example, alumina (aluminium oxide, $Al_2O_3$) is formed in a thickness of about 5 to 10 µm on a substrate 101 made of, for example, altic ($Al_2O_3$.TiC). Subsequently, a bottom shield layer 103 for a reproducing head made of, for example, permalloy (NiFe) is formed on the insulating layer 102. For example, alumina is then deposited in a thickness of 100 to 200 nm on the bottom shield layer 103 to form a shield gap film 104. An MR film 105 for constructing an MR element for reproducing is formed in a thickness of tens of nanometers on the shield gap film 104 and is formed in a desired shape by high-precision photolithography. Then a lead terminal layer 106 for the MR film 105 is formed by lift-off method. A shield gap film 107 is formed on the shield gap film 104, the MR film 105 and the lead terminal layer 106, and the MR film 105 and the lead terminal layer 106 are embedded in the shield gap films 104 and 107. An top shield-cum-bottom pole (hereinbelow, referred to as bottom pole) 108 with 3 µm thick made of a magnetic material such as permalloy (NiFe) used for both the reproducing head and the recording head is formed on the shield gap film 107.

On the bottom pole 108, a write gap layer 109 with 200 nm thick made of as an insulating film such as an alumina film is formed. Further, the write gap layer 109 is patterned by photolithography and an opening 109a for connecting the top pole and the bottom pole is formed. Subsequently, a pole tip 110 is formed by using a magnetic material such as permalloy (NiFe) or iron nitride (FeN) by plating and a connecting part pattern 110a for connecting the top pole and the bottom pole is formed. By the connecting part pattern 110a, the bottom pole 108 and a top pole layer 116 which will be described hereinlater are connected and formation of a through hole after a CMP (Chemical Mechanical Polishing) process which will be described hereinlater is facilitated.

Subsequently, as shown in FIGS. 17A and 17B, the pole tip 110 is used as a mask and the write gap layer 109 and the bottom pole 108 are etched about 0.3 to 0.5 µm by ion milling. Etching is performed to the bottom pole 108 and a trim structure is obtained, thereby preventing the effective write track width from being expanded (that is, the expansion of a magnetic flux in the bottom pole is suppressed when data is being written). Subsequently, an insulating layer 111 made of, for example, alumina with a thickness of about 3 µm is formed on the whole surface and then the whole surface is planarized by CMP.

As shown in FIGS. 18A and 18B, a thin film coil 112 as the first layer for an inductive recording head made of, for example, copper (Cu) is selectively formed on the insulating layer 111 by plating or the like. Simultaneously, a pattern 112a for connecting coils is formed integrally with the thin film coil 112 on the insulating layer 111 rearward of the connecting part pattern 110a. A photoresist film 113 is formed in a predetermined pattern by high-precision photolithography so as to cover the insulating layer 111, thin film coil 112 and coil connecting pattern 112a. The photoresist film 113 is patterned so as to form openings 113a and 113b for exposing the top surface of each of the connecting part pattern 110a and the coil connecting pattern 112a. Subsequently, heat treatment is performed at a predetermined temperature for planarizing the photoresist film 113 and for insulating between the turns of the thin film coil 112.

As shown in FIGS. 19A and 19B, a thin film coil 114 as the second layer is selectively formed on the photoresist film 113. Simultaneously, a pattern 114a for connecting coils to be electrically connected to the coil connecting pattern 112a is formed integrally with the thin film coil 114 on the opening 113b of the photoresist film 113. Subsequently, a photoresist film 115 is formed so as to cover the thin film coil 114 as the second layer and the coil connecting pattern 114a. Further, heat treatment is performed at a predetermined temperature for planarizing the photoresist film 115 and for insulating between the turns of the thin film coil 114.

As shown in FIGS. 20A and 20B, an top yoke-cum-top pole layer (hereinbelow, referred to as top pole layer) 116 made of a magnetic material such as permalloy for the recording head is selectively formed on the pole tip 110 and the photo resist films 113 and 115. The top pole layer 116 is in contact with and magnetically coupled to the bottom pole 108 via the connecting part pattern 110a in the opening 113a in the area (right area in the diagram) surrounded by the thin film coils 112 and 114. Subsequently, an overcoat layer 117 made of, for example, alumina is formed on the top pole layer 116. Finally, by performing a mechanical process of a slider, the track surface (air bearing surface) 118 of the recording head and reproducing head is formed, thereby completing a thin film magnetic head.

In FIGS. 20A and 20B, and FIG. 21, the coil connecting pattern 112a is connected to the inner circumferential end of the thin film coil 112 of the first layer and the coil connecting pattern 114a is connected to the inner circumferential end of the thin film coil 114 of the second layer. In the diagrams, however, the connected parts are omitted. In the case of such a connecting mode, the winding (turning) direction of the coil, that is, the direction of a current is, for example, as follows. Specifically, when the outer circumferential end of the thin film coil 112 of the first layer is used as a start point, the current flows in one direction (for example, clockwise direction) in accordance with the order of the outer circumferential end of the thin film coil 112, the inner circumferential end of the thin film coil 112, the coil connecting pattern 112a, the coil connecting pattern 114a, the inner circumferential end of the thin film coil 114, and the outer circumferential end of the thin film coil 114.

In the actual manufacture of a thin film magnetic head, a wafer on which a number of the above structures are formed is divided into bars on which a number of thin film magnetic heads are arranged. The sides of the bars are polished, thereby obtaining the air bearing surface 118. In the process of forming the air bearing surface 118, the MR film 105 is also polished and a composite thin film magnetic head having a desired throat height and MR height is obtained. Further, in a actual thin film magnetic head, contact pads to be electrically connected to the thin film coils 112 and 114, and the MR film 105 are formed. In the above diagrams, however, they are omitted.

In FIGS. 20A and 21, TH indicates the throat height. In FIGS. 20A and 20B, MR-H indicates the MR height, P2W indicates the track (pole) width, the angle θ indicates an apex angle formed between the straight line connecting the corners of sides on the track face sides of the photoresist films 113 and 115, and the top surface of the top pole layer 116, and LM indicates the magnetic path length. All of the parameters are important as factors determining the performance of a thin film magnetic head.

The conventional composite thin film magnetic head formed as mentioned above has the following problems especially in reducing the size of the recording head.

The magnetic path length LM is the length of the bottom pole and the top pole in the part surrounding the thin film coils as described above. It is generally known that by shortening the magnetic path length LM, flux rise time, non-linear transition shift (NLTS) characteristic, over write characteristic, and the like of a inductive-type thin film magnetic head can be improved. The flux rise time is the time from the instant when the current is flowed to the thin film coil until the flux density in a magnetic circuit consist of the bottom and top poles reaches a predetermined level and exerts an influence on the high frequency characteristics at the time of recording. The non-linear transition shift is a phenomenon that the position of transition (part where the magnetizing direction is inverted) in which data is newly recorded is shifted by the interaction between the magnetic flux from a magnetic domain to which the recording is performed just before that and the magnetic flux of the recording head. The non-linear transition shift exerts an influence on the accuracy of the data recording position and, moreover, the surface density characteristic at the time of recording.

In order to reduce the magnetic path length LM, it is sufficient to make the pitch of the thin film coil small, but there is the limitation. Usually, a method of stacking two thin film coils sandwiching an insulating layer as shown in FIGS. 20A and 20B is employed. In this case, when the photoresist layer is used as an insulating layer as in the above example, the opening 113b for connecting the thin film coil 112 of the first layer and the thin film coil 114 of the second layer can be simultaneously formed upon patterning in the photolithography process.

Since the photoresist layer shows flowability by being heated, however, there is an inconvenience such that the end position of the photoresist layer (TH zero position as a reference of the throat height) changes in a heat treatment process. It is therefore considered to form the insulating layer between the thin film coils (hereinbelow, simply called an insulating layer between coils) by using an inorganic insulating material, instead of a photoresist as an organic material. In this case, however, a process of forming an opening for connecting the two thin film coils in the insulating layer between the coils is separately needed. Consequently, there has been a problem such that the manufacturing process is complicated.

SUMMARY OF THE INVENTION

The invention has been achieved in consideration of the problems and its object is to provide a thin film magnetic head capable of realizing high-performance head characteristics without making a manufacturing process complicated even when a multilayer coil structure is used, a method of manufacturing a thin film magnetic head, and a method of forming a thin film coil.

A thin film magnetic head of the invention comprises: at least two magnetic layers which are magnetically coupled to each other and have two magnetic poles facing each other sandwiching a gap layer in a part of the side facing a recording medium; and a thin film coil part disposed between the two magnetic layers sandwiching an insulating layer, wherein the thin film coil part has: a plurality of thin film coil layers; an interlayer insulating layer disposed so as to insulate the plurality of thin film coil layers from each other; a dummy pattern which is selectively disposed in the interlayer insulating layer and is in contact with two thin film coil layers sandwiching the interlayer insulating layer; and a coil connecting part which is formed on the side wall surfaces of the dummy pattern and electrically connects between two thin film coil layers sandwiching the interlayer insulating layer.

In a thin film magnetic head of the invention, the coil connecting part is formed on the side wall surfaces of the dummy pattern selectively disposed in the interlayer insulating layer, and the two thin film coil layers sandwiching the interlayer insulating layer are electrically connected to each other via the coil connecting part.

In a thin film magnetic head of the invention, the dummy pattern may be formed by using the same material as that of one of the two magnetic poles in the same process. The dummy pattern may be consist of a plurality of divided parts. In this case, especially, the dummy pattern can be divided into a plurality of parts by grooves in a lattice shape. The dummy pattern and the coil connecting par t may be disposed on the inside of a winding area of the plurality of thin film coil layers or on the outside of the winding area of the plurality of thin film coil layers.

A method of manufacturing a thin film magnetic head of the invention has at least two magnetic layers which are magnetically coupled to each other and have two magnetic poles facing each other via a gap layer in a part of the side facing a recording medium and a plurality of thin film coil layers disposed between the two magnetic layers via an insulating layer, and includes the steps of: selectively forming a dummy pattern on a lower insulating layer as a part of the insulating layer; forming one thin film coil layer on the bottom insulating layer and forming a coil connecting part integral with the one thin film coil layer on at least side wall surfaces of the dummy pattern; forming an interlayer insulating layer so as to cover the one thin film coil layer, the dummy pattern and the coil connecting part, and the bottom insulating layer; polishing the interlayer insulating layer until at least the coil connecting part is exposed; and forming another thin film coil layer on the interlayer insulating layer and forming another coil connecting part integral with the another thin film coil layer on the exposed surface of the coil connecting part.

In a method of manufacturing a thin film magnetic head according to the invention, the coil connecting part integral with one thin film coil layer formed at least on the side wall surfaces of the dummy pattern is covered with the interlayer insulating layer together with the one thin film coil layer, the dummy pattern and the coil connecting part, and the bottom insulating layer. On the exposed surface of the coil connecting part exposed in the step of polishing the interlayer insulating layer, the another coil connecting part integral with the another thin film coil layer is formed. Consequently, between the one thin film coil layer and the another thin film coil layer are electrically connected by the coil connecting part and the another coil connecting part.

In a method of manufacturing a thin film magnetic head according to the invention, the dummy pattern may be formed by using the same material as that of one of the two magnetic poles in the same process. The dummy pattern may be consist of a plurality of divided parts. In this case, the dummy pattern can be divided into a plurality of parts divided by grooves in a lattice shape. The dummy pattern, the coil connecting part and the another coil connecting part may be formed on the inside of the winding area of the plurality of thin film coil layers or on the outside of the winding area of the plurality of thin film coil layers.

In a method of manufacturing a thin film magnetic head according to the invention, the step of forming the one thin film coil layer and the coil connecting part may includes a step of masking the area on the bottom insulating layer except for the area in which the one thin film coil layer is formed, and the area on the dummy pattern. In this case, since the coil connecting part is not formed on the dummy pattern, the polishing process after that is smoothly performed.

A method of forming a thin film coil in which at least two coil layers are stacked of the invention include the steps of: selectively forming a dummy pattern on an insulating layer; forming a first thin film coil layer on the insulating layer and forming a coil connecting part integral with the first thin film coil layer on at least side wall surfaces of the dummy pattern; forming an interlayer insulating layer so as to cover the first thin film coil layer, the dummy pattern and the coil connecting part, and the insulating layer; polishing the interlayer insulating layer until at least the coil connecting part is exposed; and forming a second thin film coil layer on the interlayer insulating layer and forming a second coil connecting part integral with the second thin film coil layer on the exposed surface of the coil connecting part.

In a method of forming a thin film coil according to the invention, the coil connecting part integral with the first thin film coil layer formed at least on the side wall surfaces of the dummy pattern is covered with the interlayer insulating layer together with the first thin film coil layer, the dummy pattern and the coil connecting part, and the insulating layer. On the exposed surface of the coil connecting part exposed in the step of polishing the interlayer insulating layer, the second coil connecting part integral with the second thin film coil layer is formed. Consequently, between the first thin film coil layer and the second thin film coil layer are electrically connected to each other by the coil connecting part and the second coil connecting part.

In a method of forming a thin film coil according to the invention, the dummy pattern may be consist of a plurality of divided parts. In this case, the dummy pattern can be divided into a plurality of parts by grooves in a lattice shape. The dummy pattern, the coil connecting part and the another coil connecting part may be formed on the inside of a winding area of the plurality of thin film coil layers or on the outside of the winding area of the plurality of thin film coil layers.

In a method of forming a thin film coil according to the invention, the step of forming the first thin film coil layer and the coil connecting part may include a step of masking the area on the insulating layer except for the area in which the first thin film coil layer is formed and the area on the dummy pattern.

Other and further objects, features and advantages of the invention will appear more fully from the following description.

BRIEF DESCRIPTION OF THE DRAWINGS

FIGS. 4A and 4B are cross sections continued from FIGS. 3A and 3B.

FIGS. 5A and 5B are cross sections continued from FIGS. 4A and 4B.

FIGS. 18A and 18B are cross sections continued from FIGS. 17A and 17B.

DETAILED DESCRIPTION OF THE PREFERRED EMBODIMENTS

Preferred embodiments of the invention will be described in detail hereinbelow with reference to the drawings.

[First Embodiment]

Figures 7A, 7B:
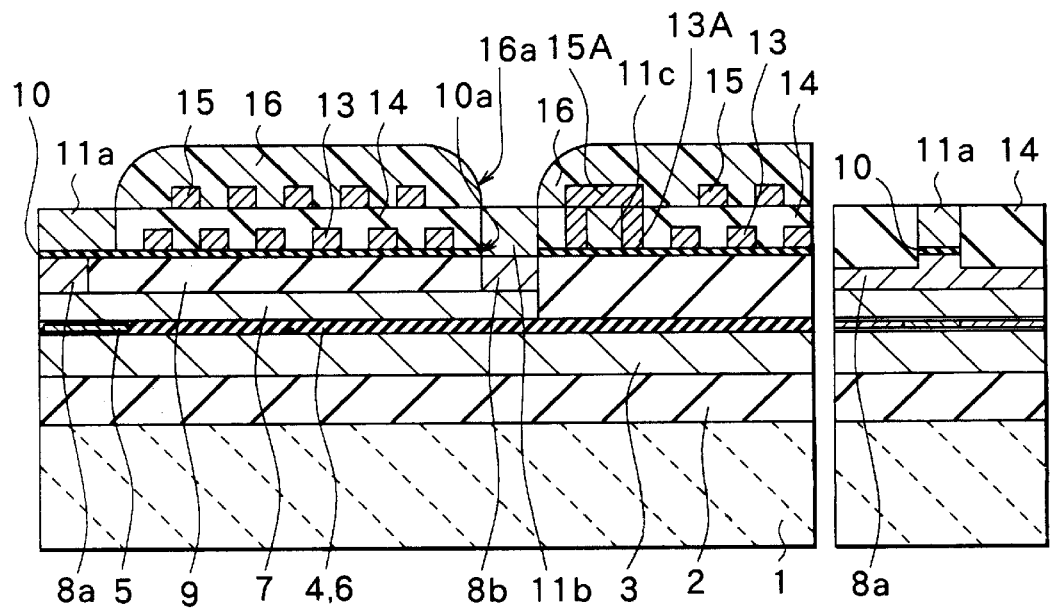
FIGS. 7A and 7B are cross sections continued from FIGS. 6A and 6B.
Figures 8A, 8B:
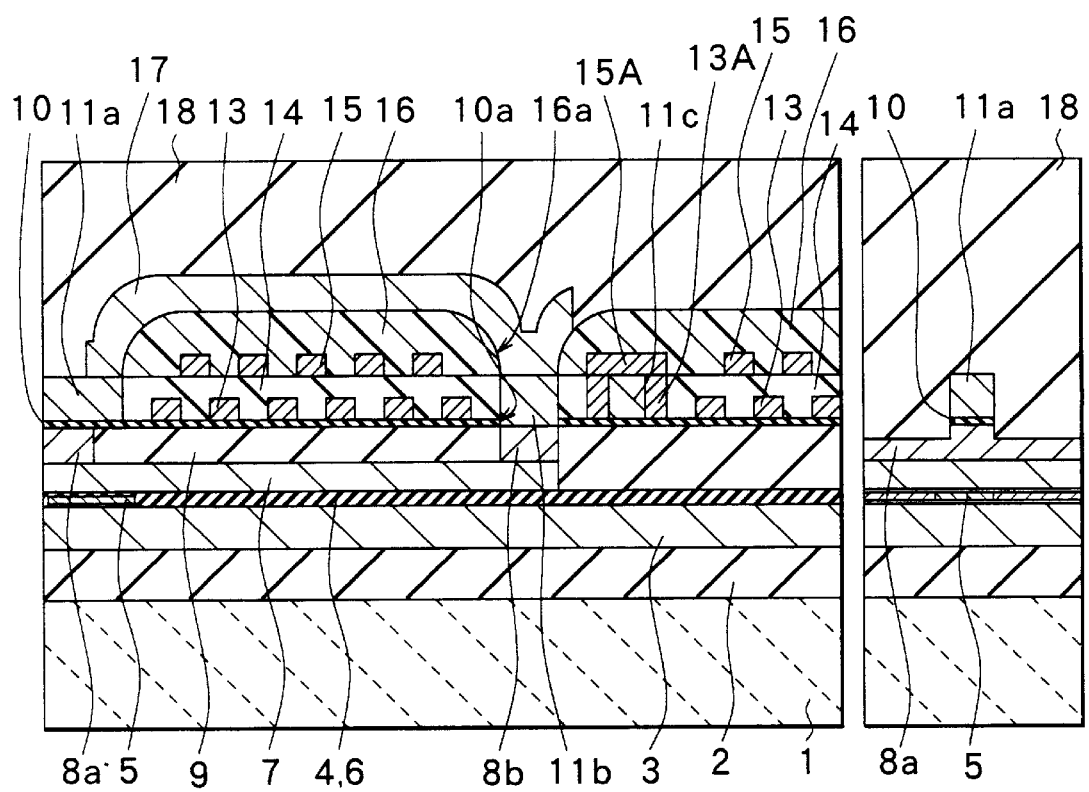
FIGS. 8A and 8B are cross sections continued from FIGS. 7A and 7B.
Figure 9:
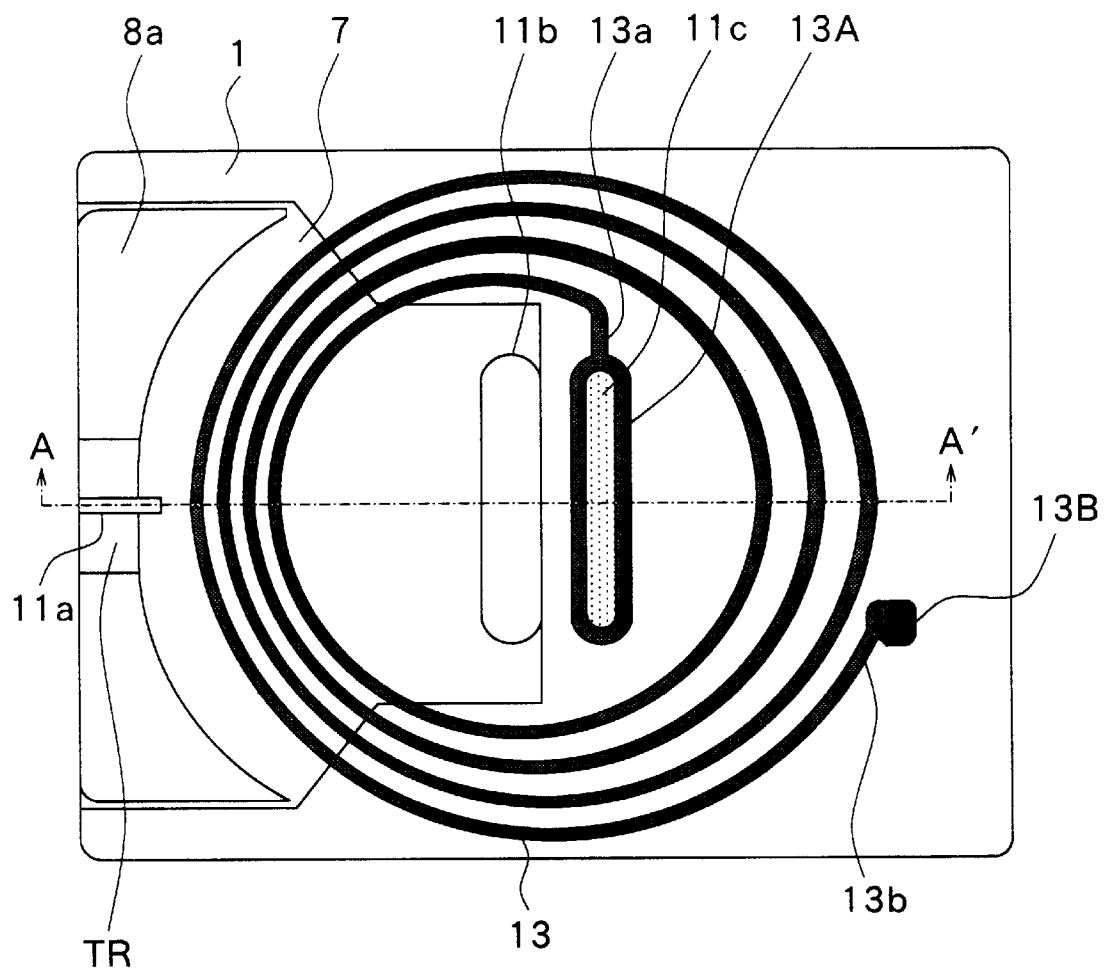
FIG. 9 is a plan view corresponding to the step shown in FIGS. 6A and 6B.
Figure 10:
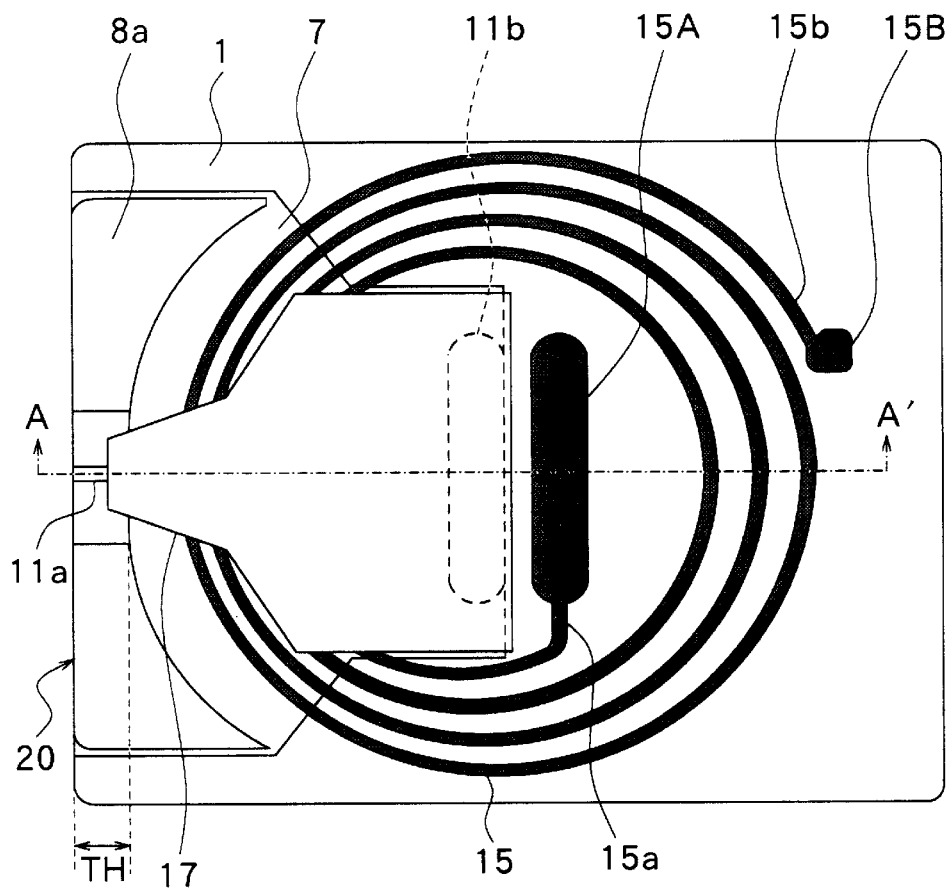
FIG. 10 is a plan view corresponding to the step shown in FIGS. 8A and 8B.

With reference to FIGS. 1A and 1B through FIG. 10, a method of manufacturing a composite thin film magnetic head as a method of manufacturing a thin film magnetic head according to the first embodiment of the invention will be described. Since a thin film magnetic head and a method of forming a thin film coil according to an embodiment of the invention are embodied by a method of manufacturing a thin film magnetic head according to the embodiment, they are also described hereinbelow. FIGS. 1A through 8A are cross sections each of which is perpendicular to the air bearing surface and FIGS. 1B thorugh 8B are cross sections each of which is parallel to the air bearing surface of the pole part. Each of FIGS. 9 and 10 shows a plan configuration of a composite thin film magnetic head.

Figures 1A, 1B:
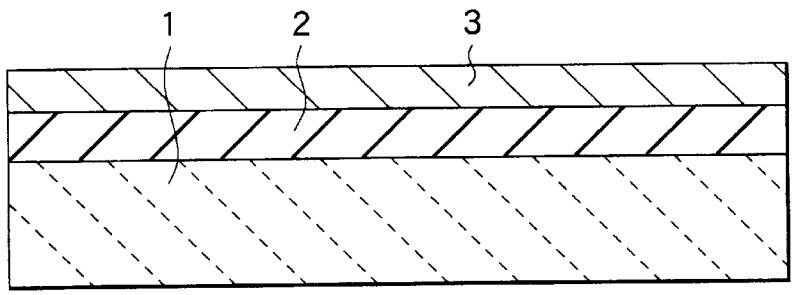
FIGS. 1A and 1B are cross sections showing a process in a method of manufacturing a thin film magnetic head according to the first embodiment of the invention.

In a method of manufacturing according to the embodiment, first, as shown in FIGS. 1A and 1B, an insulating layer 2 made of, for example, alumina ($Al_2O_3$) is deposited in a thickness of about 3 to 5 $\mu$m on a substrate 1 made of, for example, altic ($Al_2O_3$.TiC). Then, a photoresist film is used as a mask and a bottom shield layer 3 for a reproducing head made of, for example, permalloy (NiFe) is selectively formed in a thickness of about 3 mm on the insulating layer 2 by electric plating.

Figures 2A, 2B:
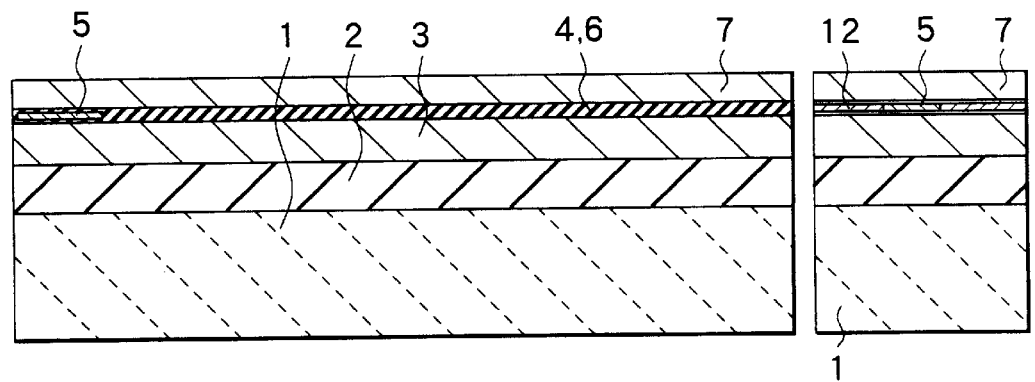
FIGS. 2A and 2B are cross sections continued from FIGS. 1A and 1B.

As illustrated in FIGS. 2A and 2B, alumina or the like is deposited in a thickness of 100 to 200 nm on the bottom shield layer 3 by sputtering, thereby forming a shield gap film 4. Subsequently, an MR film 5 for constructing an MR element for reproducing is formed equal to or less than tens of nanometers in thickness on the shield gap film 4 and formed in a desired shape by high-precision photolithography. Then a lead layer 12 as a lead electrode layer to be electrically connected to the MR film 5 is formed on both sides of the MR film 5 and, after that, a shield gap film 6 is formed on the lead layer 12, the shield gap film 4 and the MR film 5, thereby embedding the MR film 5 in the shield gap films 4 and 6.

As shown in the diagram, a top shield-cum-bottom pole (hereinbelow, referred to as bottom pole) 7 made of, for example, permalloy is selectively formed in a thickness of about 3 to 4 $\mu$m on the shield gap film 6.

Figures 3A, 3B:
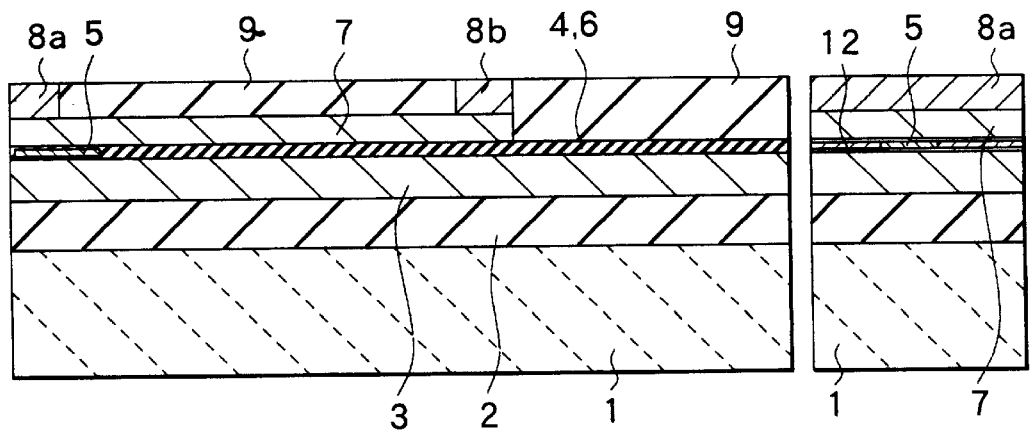
FIGS. 3A and 3B are cross sections continued from FIGS. 2A and 2B.

As illustrated in FIGS. 3A and 3B, for example, by electrolytic plating, a bottom pole piece 8a and a bottom connection piece 8b for forming a magnetic path are selectively formed on the bottom pole 7. At this time, the bottom pole piece 8a is formed in an area extending from a position which is slightly forward (left side in the diagram) of the position in which an air bearing surface is formed later to the TH zero position as the throat height reference position. The bottom connection piece 8b for forming a magnetic path is formed in a predetermined area rearward (right side in the diagram) of the bottom pole piece 8a. The bottom pole piece 8a and the bottom connection piece 8b are formed by using, for example, permalloy (NiFe), iron nitride (FeN), or the like as a high saturation magnetic material. The bottom pole 7 corresponds to an example of one of "two poles" in the invention and the bottom pole 7 and the bottom pole piece 8a correspond to an example of one of "at least two magnetic layers" in the invention.

As shown in the diagram, an insulating layer 9 made of alumina or the like is deposited by sputtering so as to cover the whole surface. After that, the whole surface is polished by CMP and the top surfaces of the bottom pole piece 8a and the bottom connection piece 8b are exposed.

As illustrated in FIGS. 4A and 4B, a write gap layer 10 which is an insulating film made of alumina or the like is formed on the bottom pole piece 8a, the bottom connection piece 8b and the insulating layer 9. Then the write gap layer 10 is selectively etched to form an opening 10a and the top surface of the bottom connection piece 8b is exposed.

As shown in the diagram, for example, by electric plating, a top pole piece 11a and a dummy pole piece 11c are selectively formed on the write gap layer 10 and, simultaneously, a top connection piece 11b is formed on the bottom connection piece 8b exposed from the opening 10a. The thickness of each of the top pole piece 11a, top connection piece 11b and dummy pole piece 11c is set to, for example, 3 to 5 $\mu$m. The top pole piece 11a has a pattern width which specifies the width of a recording track on a recording medium and is formed in an area extending from a position slightly forward (left side in the diagram) of the position in which the air bearing surface will be formed later to a position slightly rearward (right side in the diagram) of the TH zero position as a throat height reference position. The top connection piece 11b is used together with the bottom connection piece 8b to magnetically couple the bottom pole and the top pole. The dummy pole piece 11c is used later to form a coil connecting part 13A for connecting between two top and bottom thin film coils and is formed in an area slightly rearward (right side in the diagram) of the top connection piece 11b. The top pole piece 11a, the top connection piece 11b and the dummy pole piece 11c are formed by using, for example, permalloy, iron nitride, or the like. The dummy pole piece 11c corresponds to an example of a "dummy pattern" in the invention.

As shown in the diagram, a part of the write gap layer 10 and the bottom pole piece 8a is etched by, for example, ion milling for about 0.5 μm by using the top pole piece 11a as a mask, thereby obtaining a trim structure.

As illustrated in the diagram, a thin film coil 13 of the first layer for an inductive-type recording head made of copper (Cu) or the like is formed on the write gap layer 10 by, for example, electrolytic plating. The thickness of the thin film coil 13 is thinner than that of each of the top pole piece 11a, top connection piece 11b and dummy pole piece 11c and is set to, for example, 2 to 3 μm. Simultaneously, the coil connecting part 13A which is integral with the thin film coil 13 is formed on the side wall surfaces and the top surface of the dummy pole piece 11c. More specifically, a thin seed layer (not shown) made of copper or the like is formed on the whole surface and, after that, a photoresist layer (not shown) is deposited so as to cover the area except for the area in which the thin film coil 13 and the coil connecting part 13A are formed. The thin film coil 13 and the coil connecting part 13A made of copper are grown on the seed layer in the exposed area in a plating liquid. After removing the photoresist layer, an unnecessary seed layer is removed by ion milling and the winding parts of the coils are separated, thereby obtaining a structure as shown in FIGS. 4A and 4B. The thin film coil 13 corresponds to an example of a "one thin film coil layer" and an example of the "first thin film coil layer" in the invention.

As shown in FIGS. 5A and 5B, an insulating layer 14 made of alumina or the like is formed on the whole surface to bury the rough surface formed by the top pole piece 11a, top connection piece 11b, thin film coil 13 and coil connecting part 13A. The insulating layer 14 corresponds to an example of an "interlayer insulating layer" in the invention.

Figures 6A, 6B:
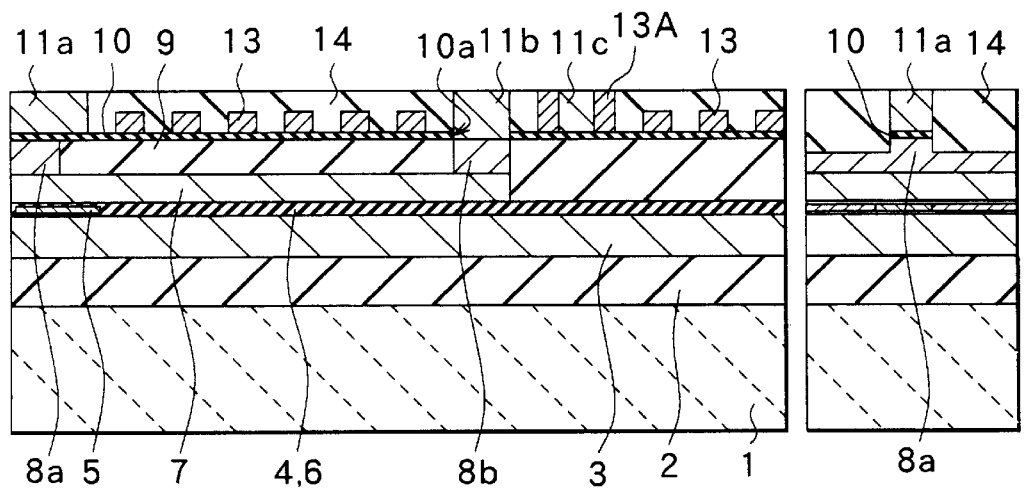
FIGS. 6A and 6B are cross sections continued from FIGS. 5A and 5B.

As illustrated in FIGS. 6A and 6B, the planarized whole surface is polished by CMP to be further planarized. The polishing amount at this time is the amount by which the top surfaces of the top pole piece 11a, top connection piece 11b and dummy pole piece 11c are exposed. Consequently, the coil connecting part 13A on the dummy pole piece 11c is completely removed and remains only on the side wall surfaces of the dummy pole piece 11c.

As shown in FIGS. 7A and 7B, a thin film coil 15 of the second layer is formed on the insulating layer 14. Simultaneously, a coil connecting part 15A integral with the thin film coil 15 is formed on the exposed dummy pole piece 11c and coil connecting part 13A. By the operation, the coil connecting part 13A and dummy pole piece 11c, and coil connecting part 15A are electrically connected to each other. That is, between the thin film coil 13 of the first layer and the thin film coil 15 of the second layer are electrically connected via the coil connecting part 13A, the dummy pole piece 11c and the coil connecting part 15A. The thin film coil 15 corresponds to an example of the "another thin film coil layer" and the "second thin film coil layer" in the invention and the coil connecting part 15A corresponds to an example of the "another coil connecting part" and the "second coil connecting part" in the invention.

As shown in the diagram, a photoresist layer 16 as an organic insulating layer is selectively formed so as to cover the thin film coil 15 and the coil connecting part 15A on the insulating layer 14. At this time, an opening 16a for maintaining the top surface of the top connection piece 11b in an exposed state is formed in the photoresist layer 16. Subsequently, heat treatment is performed at a temperature of, for example, 250° C. in order to planarize the thin film coil 15 and to insulate the winding parts from each other in the thin film coil 15.

As shown in FIGS. 8A and 8B, a top yoke-cum-top pole (hereinbelow, referred to as top pole) 17 is selectively formed in a thickness of about 3 to 5 μm. At this time, a part of the front end side of the top pole 17 is in contact with and magnetically coupled to the top connection piece 11b and a part of the rear end side is in contact with and magnetically coupled to the bottom connection piece 8b via the opening 16a. By the arrangement, a magnetic path extending from the top pole piece 11a to the bottom pole piece 8a via the top pole 17, top connection piece 11b, bottom connection piece 8b, and bottom pole 7 is formed. The top pole piece 11a corresponds to an example of the other one of the "two poles" in the invention and each of the top pole 17 and the top pole piece 11a corresponds to an example of the other one of the "at least two magnetic layers" in the invention.

As illustrated in the diagram, an overcoat layer 18 made of alumina or the like is formed so as to cover the whole surface. Finally, by performing a mechanical process of a slider, the air bearing surface (track surface) of each of the recording head and the reproducing head is formed and a thin film magnetic head is completed.

FIG. 9 illustrates a plan structure of the thin film magnetic head in the step shown in FIGS. 6A and 6B. In the diagram, the write gap layer 10, the insulating layer 14, and the like are omitted and the number of winding times of the thin film coil 13 is smaller than that of FIGS. 4A and 4B for convenience. FIGS. 6A and 6B are cross sections taken along the line A–A' of FIG. 9. As shown in FIG. 9, the thin film coil 13 of the first layer has a spiral shape. The inner circumferential end 13a is connected to the coil connecting part 13A formed on the side wall surfaces of the dummy pole piece 11c and the outer circumferential end 13b is connected to a connecting part 13B. The connecting part 13B will be connected to one of a pair of pads (not shown) for connecting coils formed in a top layer via a through hole (not shown) in a post step (its description is omitted).

FIG. 10 shows a plan structure of the thin film magnetic head in the process illustrated in FIGS. 8A and 8B. In FIG. 10, the photoresist layer 16, the overcoat layer 18, and the like are omitted and the number of winding times of the thin film coil 15 is smaller than that of FIGS. 8A and 8B for convenience. FIGS. 8A and 8B are cross sections taken along the line A–A' of FIG. 10. As shown in FIG. 10, the inner circumferential end 15a of the thin film coil 15 of the second layer is connected to the coil connecting part 15A and the outer circumferential end 15b is connected to a connecting part 15B. The connection part 15B is to be connected to the other one of the pair of coil connecting pads (not shown) formed in a top layer via a through hole (not shown) in a post step (its description is omitted). In FIG. 10, the throat height TH is a length from the rear end (front end of the photoresist layer 16) along the A–A' line of the bottom pole piece 8a to an air bearing surface 20.

As shown in FIGS. 9 and 10, the two thin film coils 13 and 15 are electrically connected to each other via the coil connecting parts 13A and 15A. The winding (turning) direction of the coil in this case, that is, the direction of the current is, for example, as follows. To be specific, when the outer circumferential end of the thin film coil 13 of the first layer is used as a start point, the current flows in one direction (clockwise direction) in accordance with the order of the connecting part 13B on the outer circumferential end side of the thin film coil 13, the coil connecting part 13A on the inner circumferential end side of the thin film coil 13, the coil connecting part 15A on the inner circumferential end side of the thin film coil 15, and the connecting part 15B on the outer circumferential end side of the thin film coil 15.

As mentioned above, according to a method of manufacturing a thin film magnetic head of the embodiment, before forming the thin film coil 13 of the first layer, the dummy pole piece 11c thicker than tire thin film coil 13 is preliminarily formed as a dummy pattern and the coil connecting part 13A is formed by using the side wall surfaces of the dummy pole piece 11c. Consequently, when CMP is performed after forming the insulating layer 14 as an interlayer insulating layer on the whole surface, only the top surface of the coil connecting part 13A can be exposed while leaving the thin film coil 13 buried in the insulating layer 14. The process of forming an opening in the insulating layer 14 so as to be connected to the thin film coil 15 of the second layer is therefore unnecessary. Moreover, in the embodiment, since the dummy pole piece 11c is formed simultaneously in the step of forming the bottom pole piece 8a and the bottom connection piece 8b, a new step is not necessary.

Figure 11A:
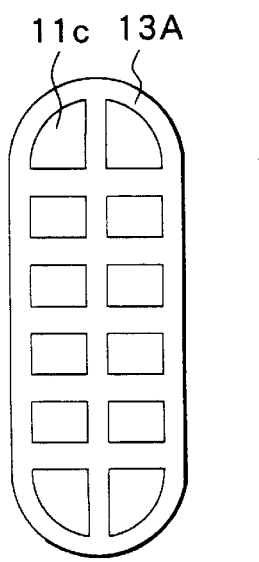
FIGS. 11A, 11B, 11C and 11D are plan views showing an example of a modification of the shape of a dummy pole piece and a coil connecting part.
Figure 11B:
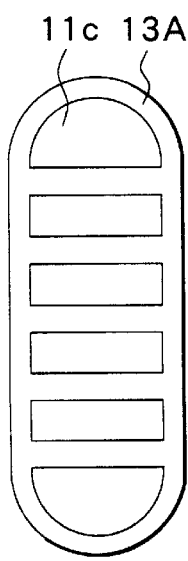
Figure 11C:
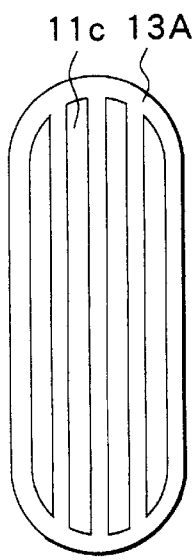
Figure 11D:
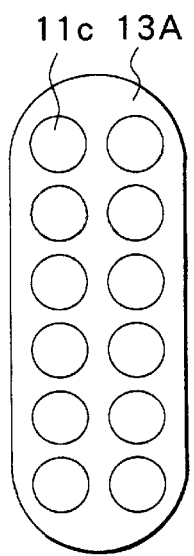

Although it has been described in the embodiment that the dummy pole piece 11c is formed as an integral dummy pattern, for example, as shown in FIGS. 11A to 11D, the dummy pole piece 11c may be divided into a plurality of pieces. FIG. 11A shows an example where the dummy pole piece 11c is divided into a plurality of parts by grooves in a lattice shape. FIG. 11B illustrates an example where the dummy pole piece 11c is divided into a plurality of parts by a plurality of grooves extending in parallel in the lateral direction. FIG. 11C shows an example where the dummy pole piece 11c is divided into a plurality of parts by a plurality of grooves extending in parallel in the vertical direction. FIG. 11D shows an example where the-dummy pole piece 11c is divided into a plurality of circular parts. In the examples of the modifications, each of the divided parts of the dummy pole piece 11c has side wall surfaces, so that the area of the side wall surfaces becomes large as a whole. Consequently, the total sum of the horizontal cross sections area of the coil connecting part 13A formed in the area becomes large. The contact area between the coil connecting parts 13A and 15A becomes accordingly large, so that the contact resistance between the thin film coils 13 and 15 can be reduced. A method of dividing the dummy pole piece 11c is not limited to the method using the grooves in a lattice shape but the dummy pole piece 11c can be also divided by grooves in the other pattern.

Figure 12:
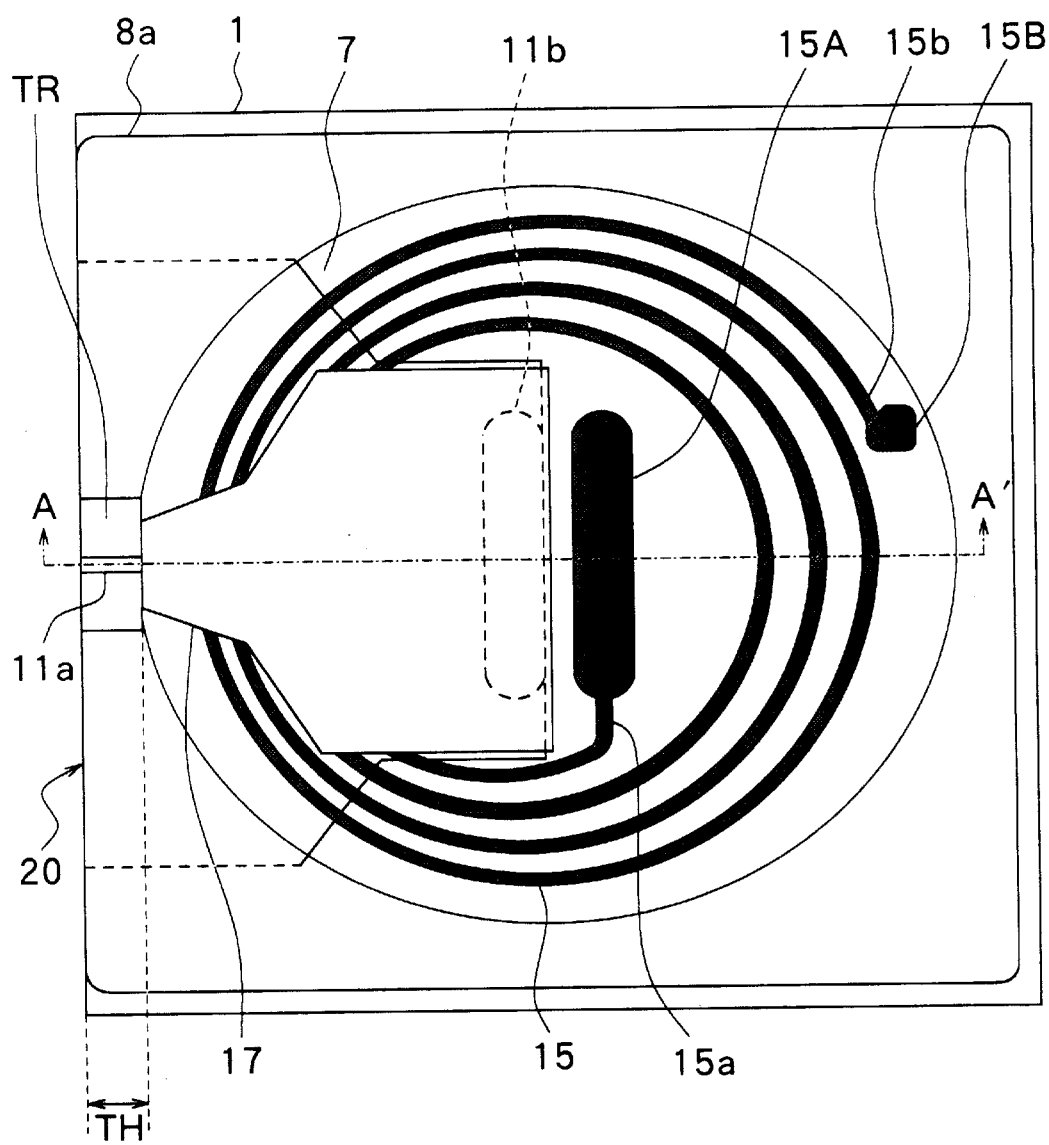
FIG. 12 is a plan view showing an example of a modification of a thin film magnetic head according to the first embodiment of the invention.

Although the bottom pole piece 8a is formed only on the front side of the area where the thin film coils 13 and 15 are formed as shown in FIG. 10, it can be also formed in the whole area surrounding the thin film coils 13 and 15, for example, as shown in FIG. 12.

[Second Embodiment]

A second embodiment of the invention will be now described.

Figures 13A, 13B:
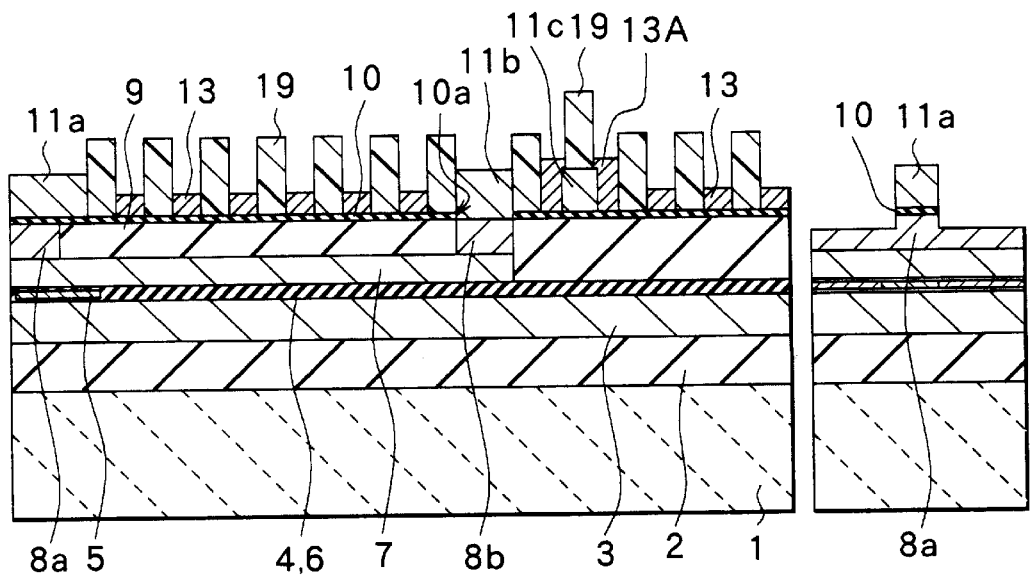
FIGS. 13A and 13B are cross sections showing a step in a method of manufacturing a thin film magnetic head according to the second embodiment of the invention.
Figures 14A, 14B:
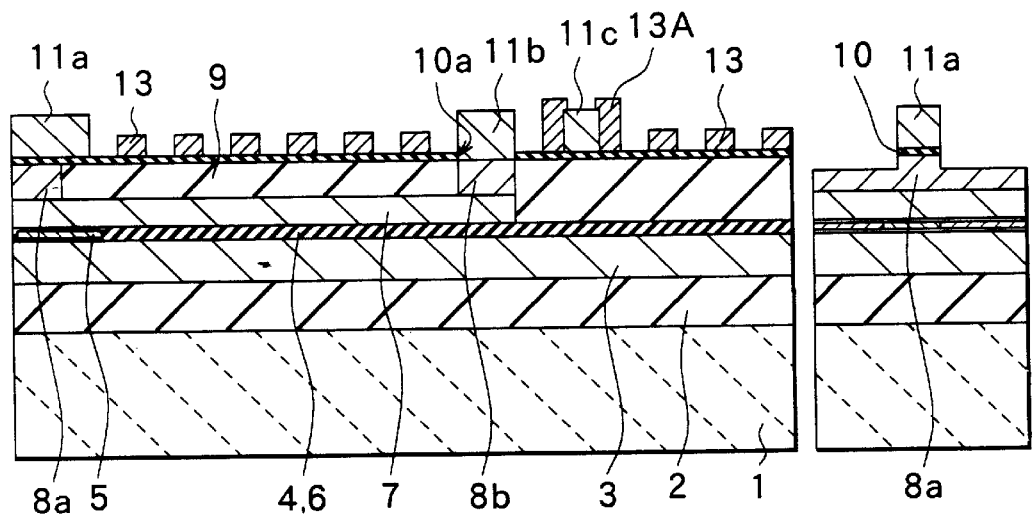
FIGS. 14A and 14B are cross sections continued from FIGS. 13A and 13B.
Figures 15A, 15B:
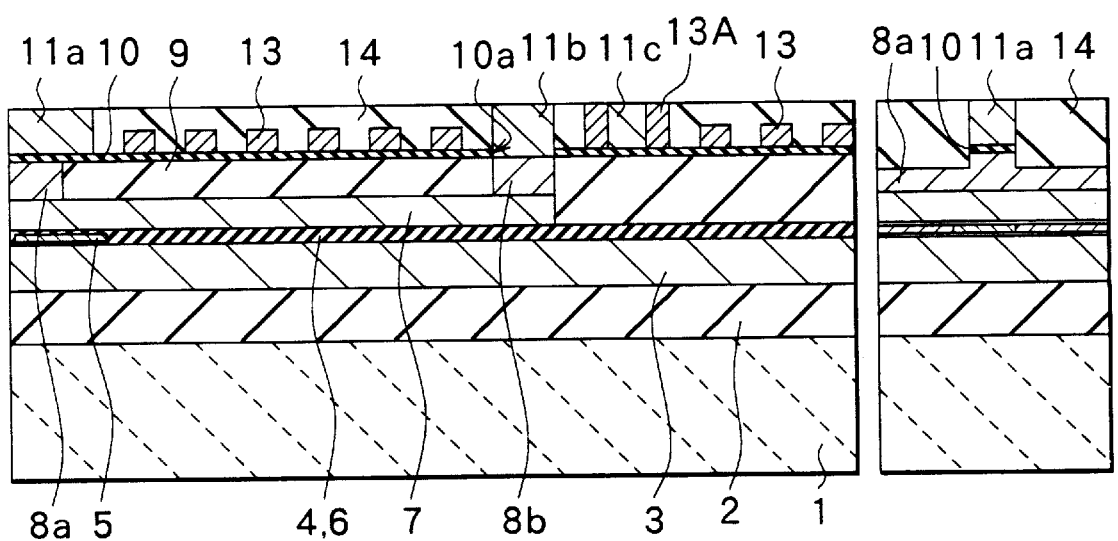
FIGS. 15A and 15B are cross sections continued from FIGS. 14A and 14B.
Figures 16A, 16B:
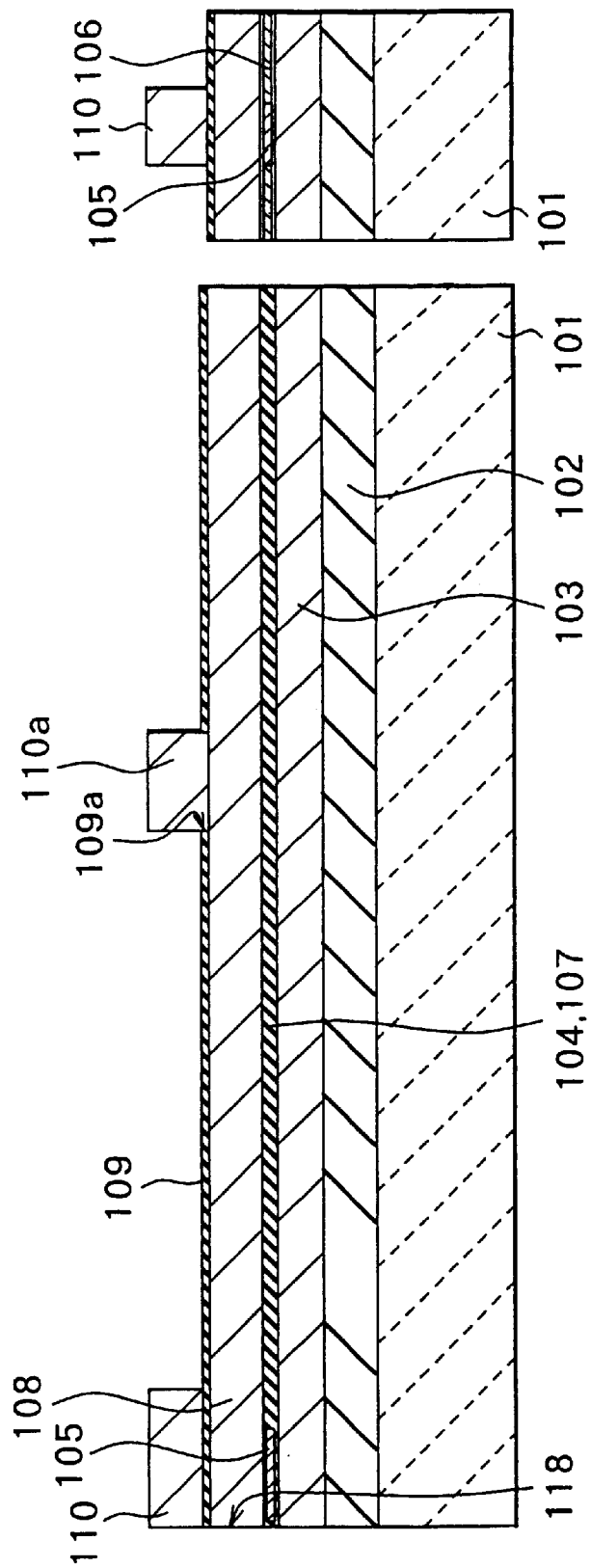
FIGS. 16A and 16B are cross sections showing a step in a method of manufacturing a conventional thin film magnetic head.
Figures 17A, 17B:
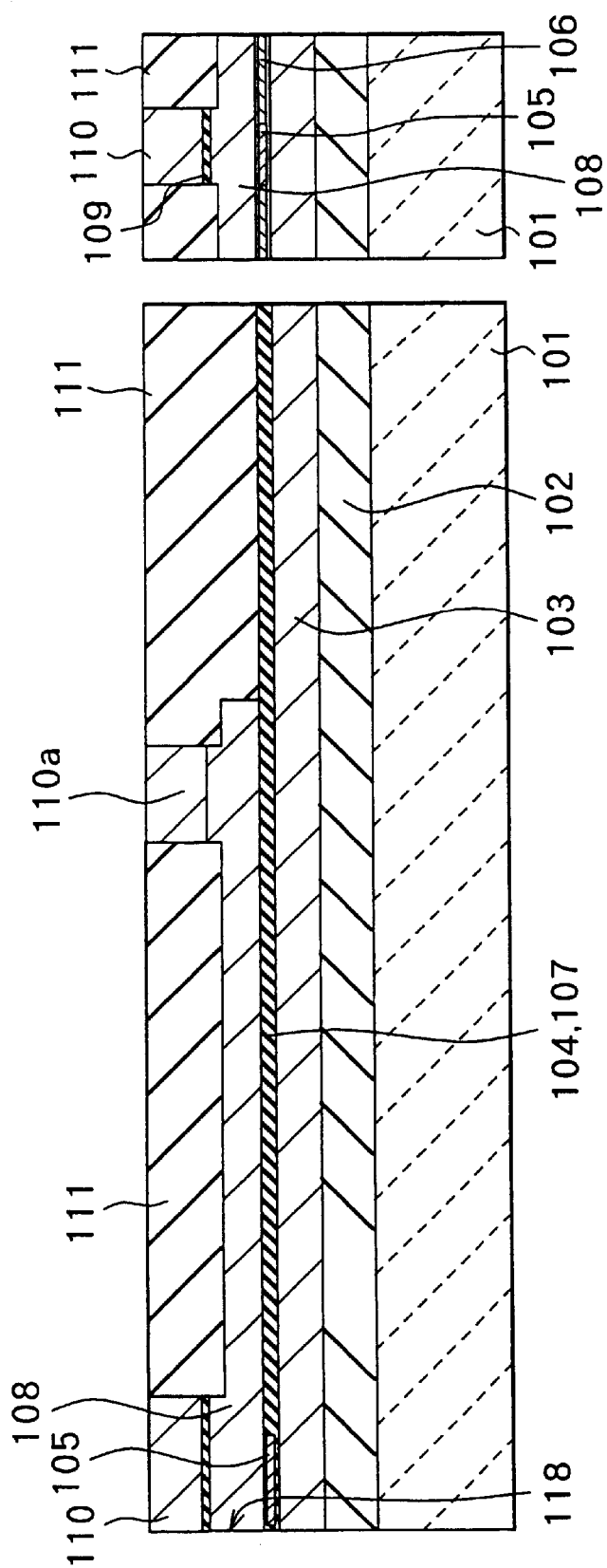
FIGS. 17A and 17B are cross sections continued from FIGS. 16A and 16B.
Figures 19A, 19B:
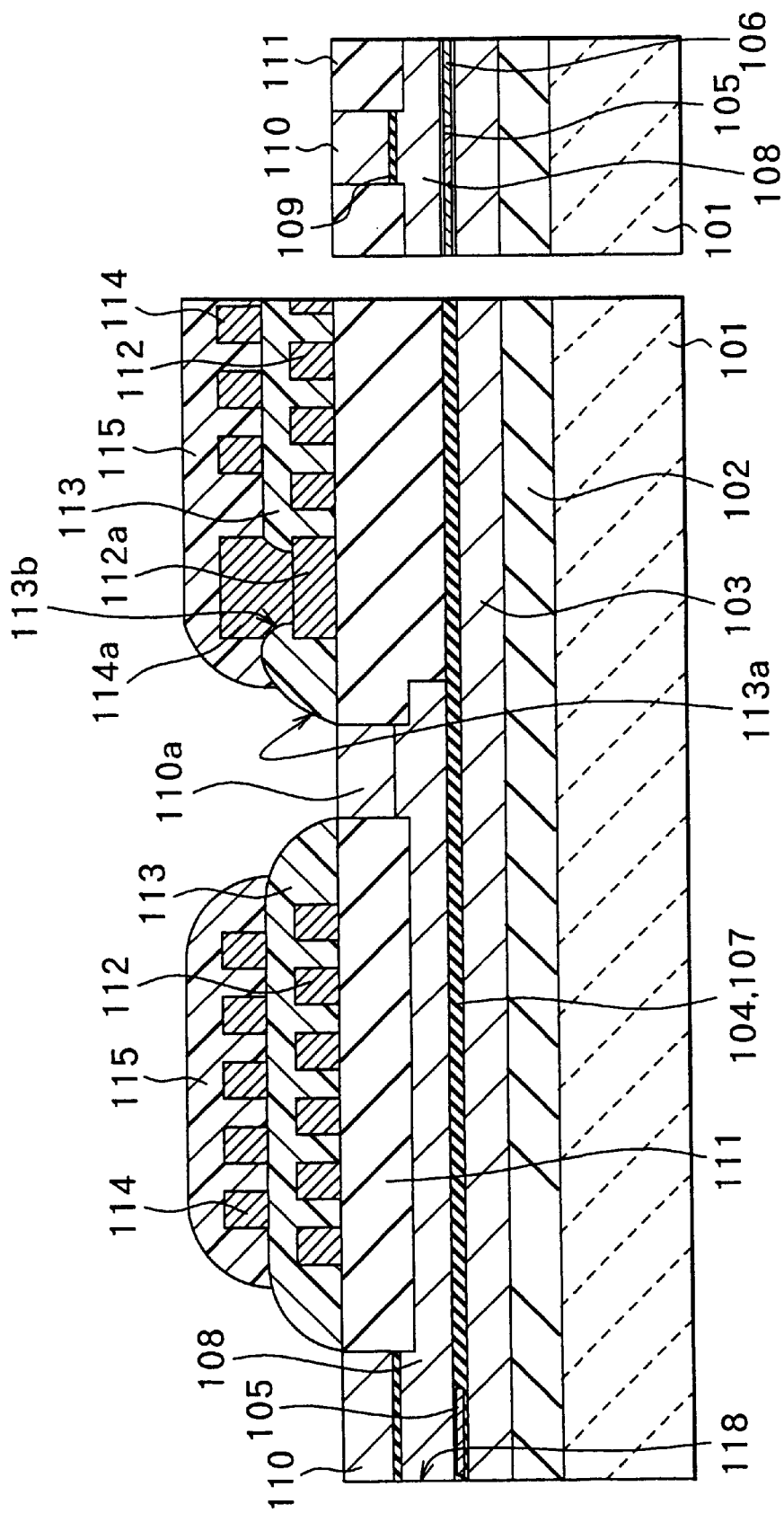
FIGS. 19A and 19B are cross sections continued from FIGS. 18A and 18B.
Figures 20A, 20B:
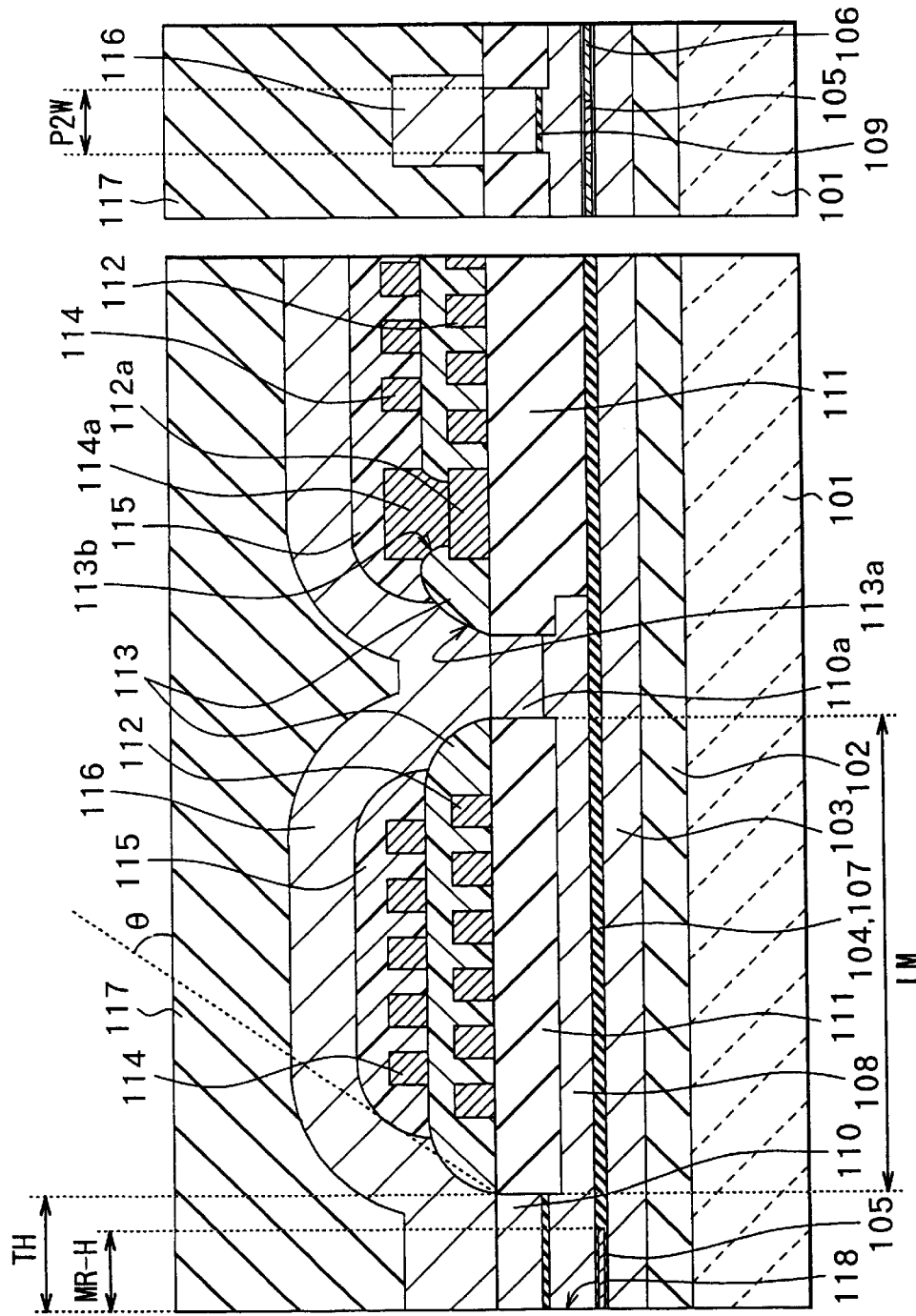
FIGS. 20A and 20B are cross sections continued from FIGS. 19A and 19B.
Figure 21:
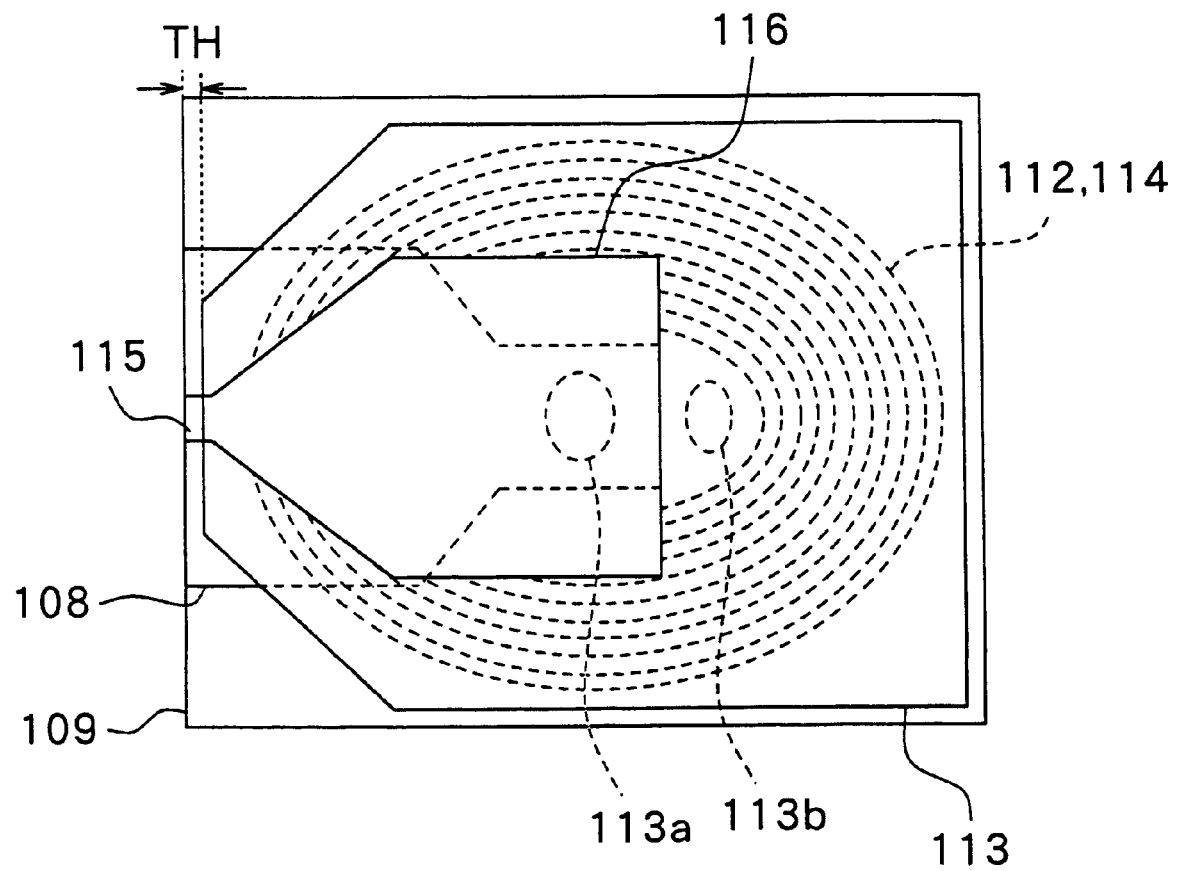
FIG. 21 is a plan view showing a plane structure of a conventional thin film magnetic head.

FIGS. 13A and 13B through FIGS. 15A and 15B show a main process in a method of manufacturing a thin film magnetic head according to the second embodiment of the invention. Since the method of forming the thin film magnetic head and the thin film coil according to the embodiment of the invention are embodied by a method of manufacturing a thin film magnetic head according to the embodiment, they will be also described hereinbelow. Each of FIGS. 13A, 14A and 15A shows a cross section perpendicular to the air bearing surface. Each of FIGS. 13B, 14B and 15B shows a cross section parallel to the air bearing surface of the pole part.

In the method of manufacturing according to the embodiment, since the processes in the first half are the same as those shown in FIGS. 1A and 1B through 3A and 3B in the first embodiment and the processes in the latter half are the same as those shown in FIGS. 7A and 7B and FIGS. 8A and 8B in the first embodiment, they are not shown and their description is omitted here.

In the second embodiment, as illustrated in FIGS. 13A and 13B, at the time of forming the thin film coil 13 of the first layer, a photoresist mask layer 19 is formed selectively not only on the write gap layer 10 but also on the dummy pole piece 11c. By using the photoresist mask layer 19 as a mask, the thin film coil 13 is grown by plating.

Then, as shown in FIGS. 14A and 14B, the photoresist mask layer 19 is removed. As a result, the coil connecting part 13A is not formed on the dummy pole piece 11c but is formed only on the side wall surfaces of the dummy pole piece 11c.

As illustrated in FIGS. 15A and 15B, the insulating layer 14 made of alumina or the like is formed on the whole surface to thereby bury the rough surface of the top pole piece 11a, top connection piece 11b, thin film coil 13 and coil connecting part 13A. After that, the whole surface is planarized by CMP to thereby expose the top surfaces of the top pole piece 11a, top connection piece 11b, and dummy pole piece 11c. By the operation, the coil connecting part 13A on the dummy pole piece 11c is completely removed and the coil connecting part 13A remains only on the side wall surfaces of the dummy pole piece 11c.

Since the subsequent steps are the same as those shown in FIGS. 7A and 7B and FIGS. 8A and 8B in the first embodiment, their description is omitted here.

As mentioned above, according to a method of manufacturing a thin film magnetic head of the embodiment, the top surface of the dummy pole piece 11c is also masked by the photoresist mask layer 19 upon formation of the thin film coil 13 of the first layer. Consequently, it can be checked that the coil connecting part 13A is formed on the dummy pole piece 11c. Thus, clogging in a polishing pad can be prevented in a later CMP process, so that deterioration in the polishing rate can be prevented. Since copper as the material of the coil connecting part 13A is soft, it clogs the polishing pad. When copper is hardly deposited on the dummy pole piece 11c as in the embodiment, the polishing amount of copper by the polishing pad can be therefore reduced.

Although the invention has been described by some embodiments, the invention is not limited to the foregoing embodiments but can be variously modified. For example, in each of the embodiments, the dummy pattern is described as the dummy pole piece 11c made of the same magnetic material as that of the top pole piece 11a in the same process. The dummy pattern may be also formed in a process different from that of the top pole piece 11a and using a material different from that of the top pole piece 11a.

The dummy pattern does not have to be a conductor like the dummy pole piece 11c in each of the embodiments but may be formed of an insulating material such as alumina. The resistance value of each of the coil connecting parts 13A and 15A made of copper which is the same material as that of the thin film coils 13 and 15 is sufficiently small as compared with that of a magnetic material such as permalloy used for the dummy pole piece 11c. The coil connecting parts 13A and 15A therefore substantially function as electrical connecting parts between the thin film coils 13 and 15.

Although the dummy pole piece 11c is formed in the area on the inside of the thin film coils 13 and 15 and between the two thin film coils are connected in the foregoing embodiments, the invention is not limited to the arrangement. It is also possible to form the dummy pole piece 11c in the area on the outside of the thin film coils 13 and 15 and connect between the two thin film coils.

As described above, according to a thin film magnetic head of the invention, the dummy pattern is selectively formed in the interlayer insulating layer, the coil connecting part is formed on the side wall surfaces of the dummy pattern, and between the two thin film coil layers sandwiching the interlayer insulating layer are electrically connected via the coil connecting part. Thus, an effect such that the thin film coil layers can be electrically connected to each other by a method different from the conventional method of forming an opening in the interlayer insulating layer and burying the opening with a conductor is produced.

According to a method of manufacturing a thin film magnetic head of the invention, the dummy pattern is formed before depositing one thin film coil layer, the coil connecting part integral with the one thin film coil layer is formed at least on the side wall surfaces of the dummy pattern, the one thin film coil layer, the dummy pattern and the coil connecting pattern, and the bottom insulating layer are covered with the interlayer insulating layer, the coil connecting part is exposed by polishing the interlayer insulating layer, and the other coil connecting part integral with the other thin film coil layer is formed on the exposed surface, thereby electrically connecting between the one thin film coil layer to the other thin film coil layer via the coil connecting part and the other coil connecting part. Consequently, the process of forming an opening in the interlayer insulating layer in the part connecting the coils is made unnecessary.

Especially, according to the thin film magnetic head or a method of manufacturing a thin film magnetic head of the invention, since the dummy pattern is formed in the same process by using the same material as that of one of the two poles, an effect such that it is unnecessary to newly add the step of forming the dummy pattern and the increase in the number of steps can be avoided is produced.

According to a method of manufacturing a thin film magnetic head, the step of forming one of thin film coil layers and the coil connecting part includes the step of masking the area on the bottom insulating layer except for the area in which the one thin film coil layer is formed and the area on the dummy pattern. It is therefore prevented that the coil connecting part is formed on the dummy pattern and an effect such that the subsequent polishing process can be smoothly performed is produced.

According to a method of forming a thin film coil of the invention, the dummy pattern is formed before depositing the first thin film coil layer, the coil connecting part integral with the first thin film coil layer is formed on at least the side wall surfaces of the dummy pattern, the first thin film coil layer, the dummy pattern and the coil connecting part, and the insulating layer are covered with an interlayer insulating layer, the whole is polished to thereby expose the coil connecting part, and the second coil connecting part integral with the second thin film coil layer is formed on the exposed surface, thereby electrically connecting between the first and second thin film coil layers via the coil connecting part and the second coil connecting part. Thus, an effect such that the step of forming an opening in the interlayer insulating layer in the part connecting the coils is made unnecessary is produced.

Especially, according to a method of forming a thin film coil of the invention, the step of forming the first thin film coil layer and the coil connecting part includes the step of masking the area on the insulating layer except for the area in which the first thin film coil layer is formed and the area on the dummy pattern. Consequently, it is prevented that the coil connecting part is formed on the dummy pattern and an effect such that the subsequent polishing process can be smoothly performed is produced.

Moreover, according to a thin film magnetic head, a method of manufacturing a thin film magnetic head, and a method of forming a thin film coil, the dummy pattern is consist of a plurality of divided parts. Thus, the contact resistance between the plurality of thin film coils (or between one thin film coil and the other thin film coil, or between the first thin film coil and the second thin film coil) can be reduced and, as a result, an effect such that increase in resistance of the whole thin film coil can be prevented is produced.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
   at least two magnetic layers which are magnetically coupled to each other and have two magnetic poles facing each other sandwiching a gap layer in a part of the side facing a recording medium; and
   a thin film coil part disposed between the two magnetic layers sandwiching an insulating layer,
   wherein the thin film coil part has:
      a plurality of thin film coil layers;
      an interlayer insulating layer disposed so as to insulate the plurality of thin film coil layers from each other;
      a dummy pattern which is selectively disposed in the interlayer insulating layer and is in contact with two thin film coil layers sandwiching the interlayer insulating layer; and
      a coil connecting part which is formed on the side wall surfaces of the dummy pattern and electrically connects between two thin film coil layers sandwiching the interlayer insulating layer.

2. A thin film magnetic head according to claim 1, wherein the dummy pattern is formed by using the same material as that of one of the two magnetic poles in the same process.

3. A thin film magnetic head according to claim 1, wherein the dummy pattern includes a plurality of divided parts.

4. A thin film magnetic head according to claim 2, wherein the dummy pattern includes a plurality of divided parts.

5. A thin film magnetic head according to claim 3, wherein the plurality of divided parts are formed by grooves in a lattice shape.

6. A thin film magnetic head according to claim 4, wherein the plurality of divided parts are formed by grooves in a lattice shape.

7. A thin film magnetic head according to claim 1, wherein the dummy pattern and the coil connecting part are disposed on the inside of a winding area of the plurality of thin film coil layers.

\* \* \* \* \*